July 12, 1949.　　　　　E. F. KRIST　　　　　2,475,668
ANNULAR CUTTER
Filed Feb. 27, 1946
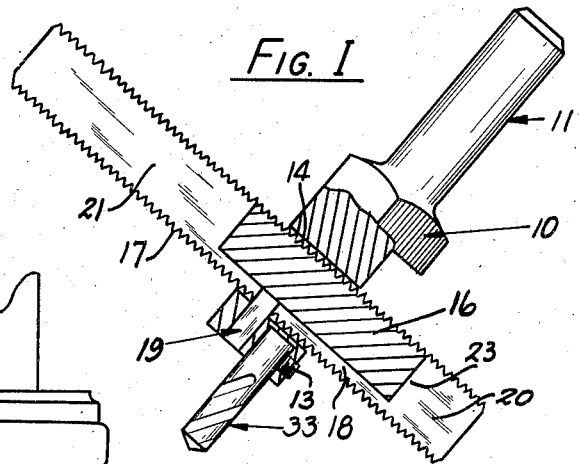
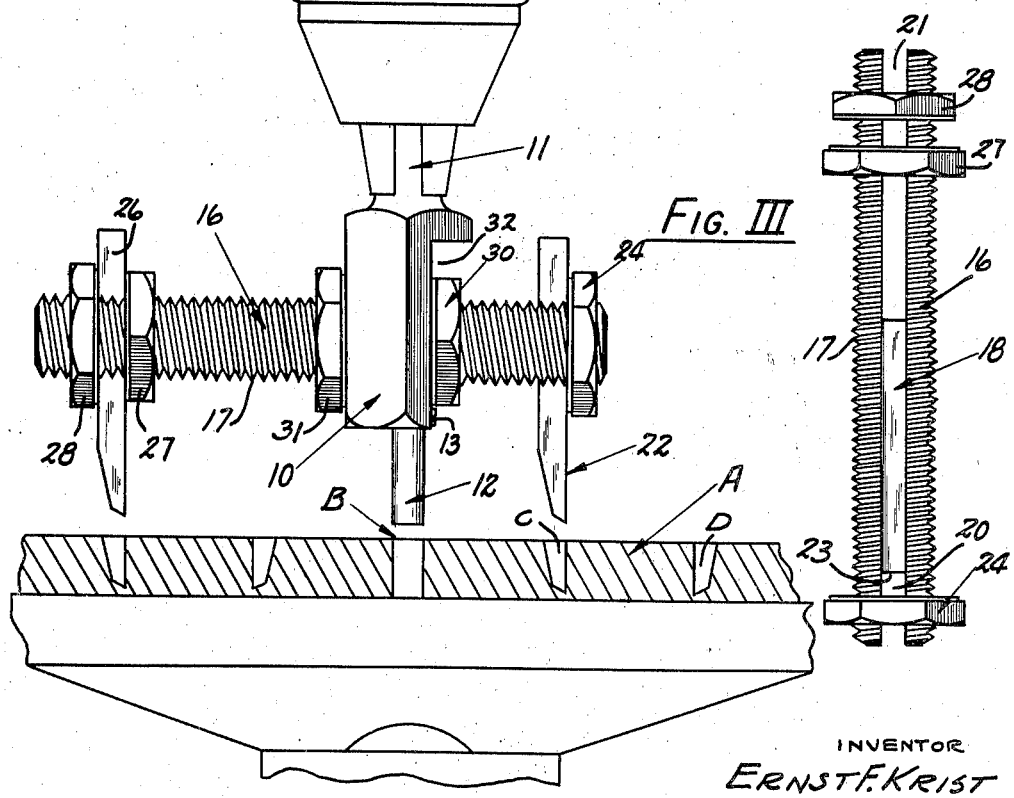
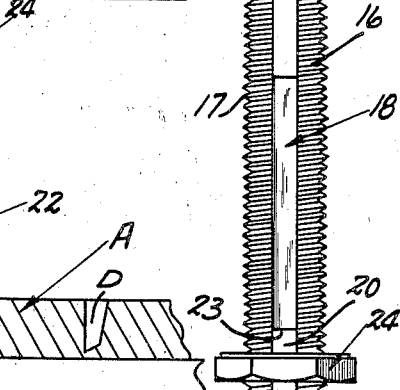
INVENTOR
ERNST F. KRIST
BY Wheeler, Wheeler & Wheeler
ATTORNEYS Patented July 12, 1949

2,475,668

UNITED STATES PATENT OFFICE 2,475,668

ANNULAR CUTTER

Ernst F. Krist, Milwaukee, Wis.

Application February 27, 1946, Serial No. 650,431

7 Claims. (Cl. 77—69)

My invention relates to improvements in boring and cutting tool mountings.

The objects of my invention are to provide a mounting upon which a plurality of tools may be adjusted at varying distances from each other, to provide means for supporting such a mounting in a drill press, to provide for centering it with reference to the work, to provide for shifting the tools laterally with reference to the work and to each other, and, in general, to provide an improved means for supporting boring and cutter tools for relative rotation with reference to portions of work at different distances from the axis of rotation.

In the drawings:

Figure 1 is a view of a mounting embodying my invention, showing the same partly in section and partly in elevation.

Figure 2 is a plan view of the same attached to a drill press, and showing a piece of work partly in section.

Figure 3 is a detail view of the slotted tool supporting bar and associated tool clamping nuts.

Like parts are identified by the same reference characters throughout the several views.

A mounting block 10, preferably of a generally hexagonal cross section, is provided with a shank 11 at one end and a detachable centering pin 12 at the other end, socketed in the block, and secured by a set screw 13, whereby the centering pin may be removed and a boring tool substituted when center boring is required.

The block 10 is provided with a transverse bore 14, in which a tool supporting bar 16 of circular cross section and screw-threaded from end to end as indicated at 17, is mounted for sliding adjustment. This bar is provided with a channel-like key-way 18 and is engaged with a key 19 carried by the mounting block 10. The end portions of the bar 16 are slotted, as indicated at 20 and 21, whereby a cutter tool 22 may be clamped against the shoulder 23 at the inner end of the slot 20 by a clamping nut 24, and another cutter tool 26 may be secured in various positions in the slot 21 by a pair of clamping nuts 27 and 28.

The bar 16 may be adjusted longitudinally in the block 10 and clamped in any desired position of adjustment by clamping nuts 30 and 31, the block 10 being cut away as indicated at 32 to allow the clamping nut 30 to approach the central axis, whereby the tool 22 may be adjusted in close proximity to the block 10 by adjusting the bar 16 longitudinally in the bore 14 for that purpose preparatory to tightening the clamping nuts 30 and 31.

As illustrated, the work piece A is being carried in a drill press in a position to allow the centering pin 12 to enter a central aperture B in the work, and the tools 22 and 26 adjusted for cutting annular grooves C and D in the work at different distances from its center. The slot 21 being an open-ended slot, more than one tool 26 may be mounted therein and secured by clamping nuts 27 and 28. Therefore the work to be done is not limited to the cutting of the two grooves C and D, nor to the boring of a central aperture at B.

Circles may be cut in the work to a tolerance of .001 of an inch, each cutter being held by clamping nuts instead of set screws, such as are ordinarily employed. With a screw thread 17 of slight pitch, a micrometer-like adjustment of the cutter is made possible by means of the clamping nuts 24, 26, 30 and 31.

In Figure 1 I have illustrated the mounting block 10 as provided with a drill 33, whereas in Figure 2 I have illustrated it as provided with a centering pin 12 and secured to the mounting block by the same set screw 13.

I claim:

1. A tool mounting, comprising the combination of a mounting block provided with a supporting shank at one end and having a transverse bore, a tool supporting bar exteriorly threaded and fitted to said bore for sliding adjustment therein, clamping nuts threaded to the bar and adjustable for clamping engagement with said block to secure the bar in various positions of adjustment in the bore, each end of the bar being provided with a diametrical slot in which tools are receivable to project at both sides of the bar, and clamping nuts threaded to the bar for engagement with tools in the slots for securing such tools in the slots at varying distances from the axis of the mounting.

2. A tool mounting as set forth in claim 1, in which the slots open to the end of the bar and are connected by a longitudinal channel, the block having a key engaged in said channel to hold said bar non-rotatively in said bore while accommodating longitudinal adjustment.

3. A tool mounting comprising the combination of a mounting block provided with a transverse bore, a tool supporting bar exteriorly threaded and having at least one end provided with an open-ended slot to receive a tool for projection at both sides of the bar, and a clamping nut threaded to the bar for engagement with both ends of such a tool, said bar being splined to the block and provided with nuts for clamping it to the block.

4. A tool mounting as set forth in claim 3, in which the bar has an open-ended slot at each end for tools mounted in the slots at different distances from the axial center line of the block, and two opposed nuts engageable with one such tool.

5. The combination set forth in claim 3 in which the mounting block is provided with a driving spindle and is asymmetrically disposed respecting the axis of said spindle, being materially wider at one side of the axis than at the other thereof, whereby to facilitate location close to such axis of a tool mounted in the slot of said bar.

6. A tool mounting comprising a driving spindle, a block mounted thereon and asymmetrically disposed to have greater extent laterally at one side of the axis of said spindle than the other, a bore extending through said block from the portion of greater extent to the side of lesser extent thereof, a bar reciprocable through said bore and provided with clamp means engaged with the said sides of said block for positioning the bar, the bar having a diametrical slot adapted to receive a tool for projection upwardly and downwardly from the bar, screw threads on the bar encircling the slotted portion thereof, and a clamp nut threaded to the bar and engageable with both ends of such a tool.

7. The combination set forth in claim 6 in which the slot opens to the end of the bar and a second clamp nut opposed to the clamp nut first mentioned is positioned to engage the other side of such a tool.

ERNST F. KRIST.

REFERENCES CITED

The following references are of record in the file of this patent:

UNITED STATES PATENTS

| Number | Name | Date |
|---|---|---|
| 195,100 | Dailey | Sept. 11, 1877 |
| 400,371 | Sullivan | Mar. 26, 1889 |
| 2,226,762 | Frey | Dec. 31, 1940 |
| 2,411,697 | Smith | Nov. 26, 1946 |

FOREIGN PATENTS

| Number | Country | Date |
|---|---|---|
| 641,301 | France | Apr. 14, 1928 |